April 14, 1942.　　　S. GUERRA　　　2,279,987
NUT SHELLING MACHINE
Filed June 23, 1941　　　3 Sheets-Sheet 2

INVENTOR.
Salvador Guerra

April 14, 1942.  S. GUERRA  2,279,987
NUT SHELLING MACHINE
Filed June 23, 1941  3 Sheets-Sheet 3
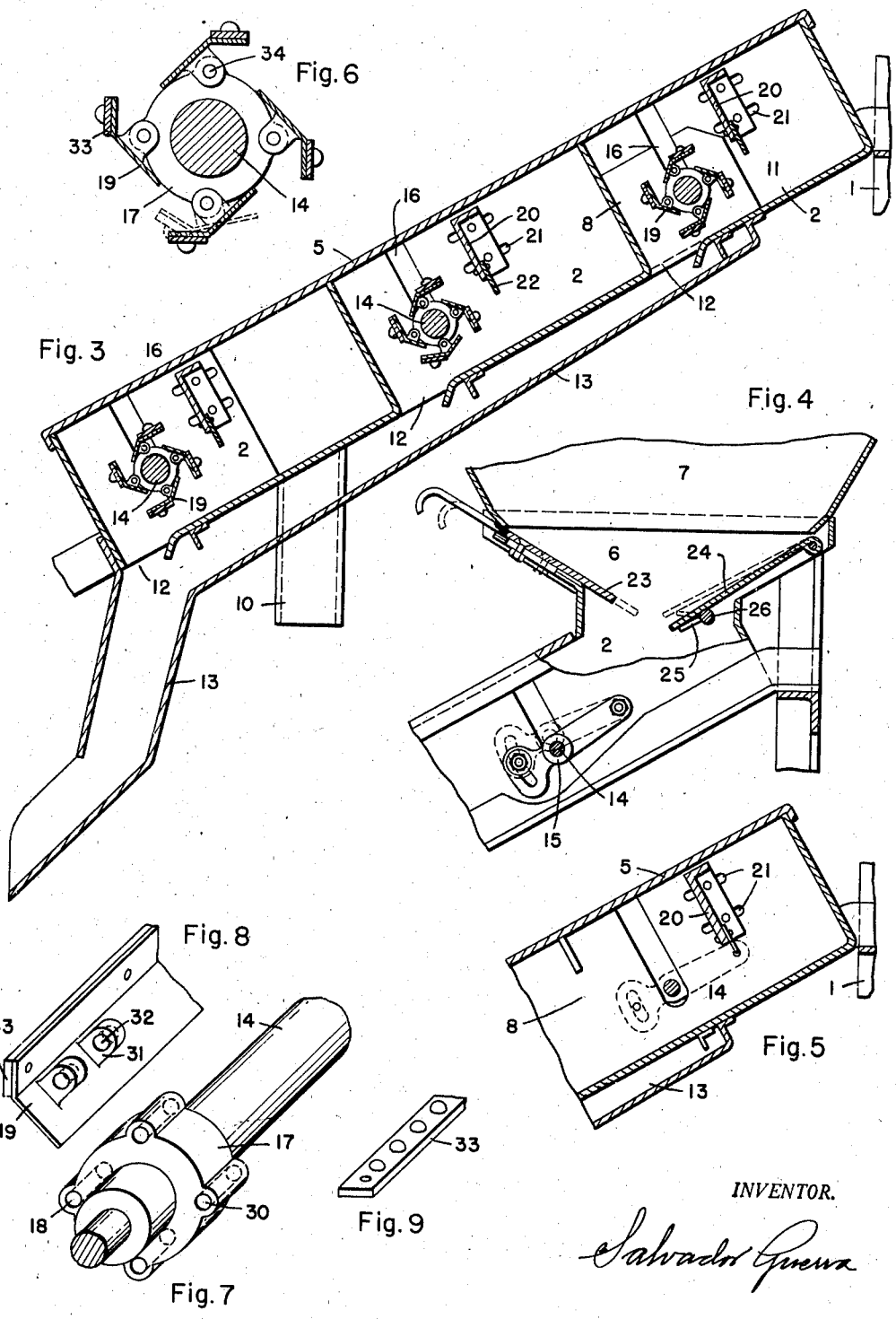
INVENTOR.
Salvador Guerra Patented Apr. 14, 1942

2,279,987

UNITED STATES PATENT OFFICE 2,279,987

NUT SHELLING MACHINE

Salvador Guerra, San Antonio, Tex., assignor to Leon K. Maulsby, San Antonio, Tex.

Application June 23, 1941, Serial No. 399,281

10 Claims. (Cl. 146—8)

My invention relates to improvements in machines for the treatment of cracked nuts whereby the kernels are removed from their partially enclosing shell fragments after the shells of the nuts have been cracked either by machine or manually.

An object of the invention is the provision of a machine for dislodging the kernels of cracked nuts from their attached shell fragments in which the operation, hereinafter referred to as "shelling," is performed by machine and a greater quantity of shelled nuts is secured than is possible by manual shelling.

Another object of the invention is the provision of a machine for shelling nuts in which the operation is accomplished without the nuts contacting human hands during the operation thereby assuring a more sanitary product.

A further object of the invention is the provision of a machine for shelling nuts in which the smaller portions of shell and kernel are subjected to a shelling process less severe than the larger portions. It is well known that the kernels from the smaller shell fragments are much easier to remove than kernels attached to the larger shell fragments which may be enclosed on several sides by the shell. Also, it is apparent that kernel and shell fragments subjected to a shelling operation more severe than is necessary for the removal of the kernel from its attached shell will result in unnecessary bruising or breaking of the kernel. This invention provides means whereby the various sizes of kernel and shell fragments passing through the machine are subjected to a shelling action corresponding to their size thereby assuring a maximum output of sound kernels.

A further object of the invention is the provision of a machine in which the shelling elements are adjustable for different sizes and types of nuts.

These objects are accomplished as described in the following specification and illustrated in the accompanying drawings in which like reference numerals refer to like parts throughout the various views.

In the drawings:

Fig. 3 is a transverse sectional view through the shelling chambers taken on the line 3—3 Fig. 2.

Fig. 4 is a fragmentary view, partly in section, taken from the right hand end of the uppermost shelling chamber.

Fig. 5 is a vertical sectional view taken on the line 5—5 Fig. 2.

Fig. 6 is an enlarged transverse sectional view of one of the rotating shelling members.

Fig. 7 is a fragmentary perspective view of the rotatable shaft for carrying the impact blades.

Fig. 8 is a fragmentary perspective view of one of the impact blades.

Fig. 9 is a fragmentary perspective view of a portion of the impact edge, detached from its blade.

Figure 1:
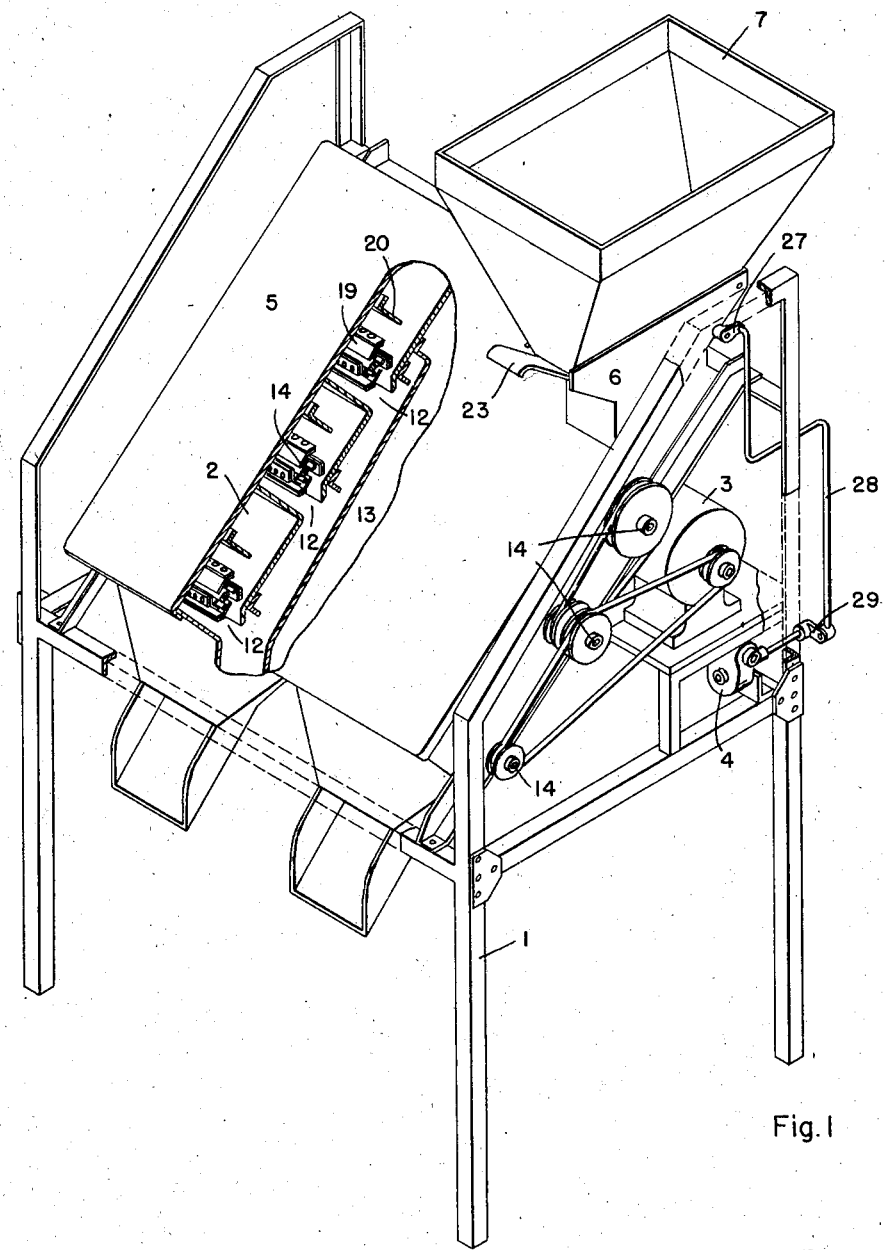
Fig. 1 is a perspective view, partly in section, of the complete machine.
Figure 2:
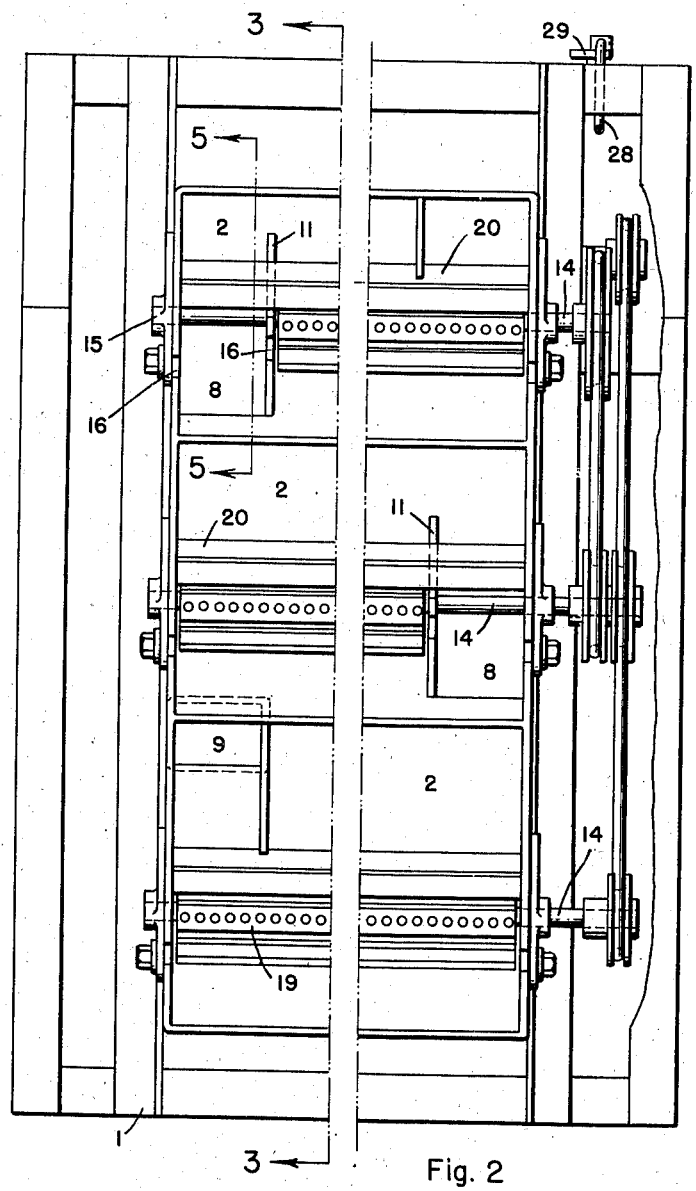
Fig. 2 is a plan of the machine with the hopper and shelling chamber cover removed to show the interior of the shelling chambers.

In describing the machine attention is invited to Figs. 1, 2 and 3. In these views it will be seen that the machine consists of a suitable framework 1 supporting a series of shelling chambers 2, a motor 3 and the reducing gear 4. The shelling chambers are supported by the frame in such manner that their sides adjoin and their bottoms are in alignment on an inclined plane, as shown in Fig. 3. A cover 5 serves to enclose the tops of the chambers when the machine is in operation and permits access to the chambers for assembling or adjustment. The upper shelling chamber is provided with the upwardly extending portion 6 supporting a supply hopper 7. The upwardly extending portion 6 forms the inlet means for the uppermost shelling chamber while the inlet means for the succeeding chambers are formed by openings 8 in the side walls of the chambers adjacent the ends of the chambers. The openings 8 also constitute discharge openings for the preceding higher shelling chamber. An examination of Figs. 2, 3 and 5 will serve to illustrate the form and relative positions of these openings. It will be seen that the opening 8 between the two upper chambers is located at the left hand end of the chambers and forms a discharge opening for the upper chamber and an inlet opening for the next chamber while the opening 8 between the two lower chambers is located at the right hand end of the chambers. Thus, material passing from chamber to chamber through the openings 8 will be obliged to travel the full length of each chamber before being discharged therefrom. A discharge opening 9 provided with a discharge chute 10 leading to the exterior of the machine is provided in the lowermost shelling chamber. A partition 11 extends upwardly from the lower wall of each of the shelling chambers employing one of the openings 8 as a discharge means approximately half the width of the chamber and forms the inner limit of the opening 8. Where any of the openings 8 establish communication between two adjoining chambers the floors of the chambers constitute the lower limit of the openings, as shown in Fig. 5.

Longitudinal discharge passages 12 are provided in the floor of each chamber these passages extending from the partitions 11 to the opposite ends of the respective chambers in the case of the two upper chambers and extending the full length of the chamber in the lowermost chamber. All of the passages 12 communicate with a common discharge chute 13 which delivers the finished material from the machine.

Shafts 14 extending lengthwise of the chambers 2 are supported at their outer ends by adjustable bearings 15 attached to the outer sides of the chamber end walls are assembled in the chambers through the slots 16 in the chamber end walls and the partitions 11. The shafts 14 are provided with any desired number of collars 17 along their length these collars being provided with holes 18 for the reception of pivot pins by means of which a series of impact blades 19 are pivoted to the collars. The parts 14, 17, 18 and 19 combine to form an impacting member whose function will be explained later.

Baffle plates 20 located above the impacting members extend the lengths of the chambers and are attached to the end walls of the chambers by suitable bolts which pass through the adjusting slots 21. The baffle plates 20 extend from the upper limit of the shelling chambers downwardly to a point substantially in line with the centers of the shafts 14. A resilient strip of some oil impervious material, indicated by the numeral 22 is provided to extend beyond the lower edge of the baffles 20 as a means of reducing the chance of bruising nut kernels which may come in contact therewith.

As shown in Figs. 1 and 4 the right hand end of the uppermost shellac chamber is provided with an upwardly extending portion 6 which supports a feed hopper 7. The hopper support 6 is provided on one side with an adjustable gate 23 for governing the feeding of nuts into the machine and provided on its other side with a pivoted gate 24 which is oscillated through a slight angle during operation of the machine to prevent wedging of the nuts between the two gates. Oscillating movement is transmitted to the gate 24 by the pin 25 carried by the shaft 26. The shaft 26 is provided at its outer end with a crank 27 (Fig. 1) connected by means of the rod 28 to a crank 29 on a shaft of the reducing gear 4.

In Figs. 1 and 2 it will be seen that the outer right hand ends of the shafts 14 are provided with driving pulleys and as shown in this particular construction the upper shaft 14 carries a comparatively large pulley connected by a belt to a smaller pulley carried by the intermediate shaft 14. The intermediate shaft 14 is provided with a second pulley of substantially the same diameter as the first pulley and the lowest shaft 14 is provided with a pulley of smaller diameter than the second pulley of the intermediate shaft. A belt passes around the pulley on the intermediate shaft, the pulley on the lowest shaft and the pulley of the motor 3 thereby transmitting power to all the shafts 14. Pulley and belt means located at the far end of the motor transmit power to the reducing gear 4.

Particular attention is invited to the pulley and belt arrangement connecting the shafts 14 with the motor 3 whereby different shaft speeds may be obtained in the different chambers. In this instance the upper shaft speed is lowest, the intermediate shaft speed is higher and the lowest shaft speed is highest.

Having thus described the structure of the machine, its operation will be described as follows:

After depositing the cracked nuts in the hopper 7 the motor 3 is started and the gate 23 is adjusted to give the desired rate of feed. Upon entering the upper shelling chamber at its right hand end the kernel and shell fragments of the nuts gravitate along the incline of the chamber floor into the path of the revolving impact blades 19. It will be noticed that a limited amount of clearance is provided between the outermost position of the revolving impact blades and the floor of the chamber so that kernel and shell particles under a predetermined size will pass between the revolving impact blades and the floor of the chamber and discharge through the discharge opening 12 into the discharge chute 13 without further agitation while particles larger than this size will be thrown upwardly along the incline of the chamber floor and against the rear wall thereof and thereafter gravitate again into the path of the impact blades 19. As long as the particles are too large for passage between the blades 19 and the floor of the chamber this cycle will be repeated until the particles are either broken down into sizes which will pass the impact blades or until they have progressed the length of the shelling chamber where they are projected around the partition 11 and gravitate through the opening 8 into the next lower shelling chamber.

In the second shelling chamber the cycle of operations is similar to that in the first chamber except that more clearance is allowed between the blades 19 and the floor of the chamber and the particles which are too large to pass between the blades 19 and the floor of the chamber, or which are not reduced to a passing size in the chamber, progress to the right along the length of the chamber and are projected around the partition 11 thence gravitating through the opening 8 into the right hand end of the lowermost chamber in which the impact blades 19 are set still higher with relation to the floor of the chamber. All particles which will not pass between the impact blades and the floor of the lowermost chamber progress to the left along the length of the chamber to its left hand end where the impact blades project them into a discharge chute 10. Thus, all kernels and shell which have passed beneath any of the impact blades are discharged through the chute 13 connecting with all of the shelling chambers while any uncracked nuts, or foreign materials, will be discharged through the chute 10 and separated from the portions which have passed beneath the impact blades.

For the purpose of preventing particles which are too large to pass between the blades and the floors of the various chambers from being thrown over the rotating impact blades and into the discharge passages 12 the baffles 20 extending the length of the chambers and attached to the end walls thereof by suitable bolts are provided. Slots 21 in the ends of the chambers permit adjustment of the baffles 20 with relation to the position of the impact blades. In order to provide a degree of safety in the event large pieces should become wedged between the impact blades and the lower edge of the baffle 20 the lower edge of the baffle is provided with a flexible strip 22, preferably of an oil resisting material in order to reduce the danger of contaminating the nuts by contact with a rancid oil-soaked material.

The structure of the rotating nut agitating member is illustrated specifically in Figs. 6 to 9 inclusive. A suitable number of collars 17 are provided along the length of the shaft 14 these collars being provided with holes 30. Projecting from the inner surface of the blades 19 are lugs 31 spaced along the length of the blades so as to register with the collars 17 and provided with holes 32 for the reception of a pivoting pin to secure the blades to the collars 17. Fig. 6 illustrates, in full lines, the positions assumed by the blades 19 when the shaft is rotating. The proper direction of rotation for the shafts 14, as illustrated in Figs. 3 to 6 inclusive is counter-clockwise. Since there is considerable wear on the impacting edge of the blade 19 it is advantageous to form this edge of a separate renewable piece 33 which may be riveted, or otherwise attached, to the blade 19, thus permitting renewal of the edge only when it becomes worn. It has also been found of advantage to provide a series of bead-like raised portions along the outer face of the edge 33.

In assembling a pivot pin 34 is passed through the holes 30 and 32 thus securing the blade to the collars 17.

An inspection of Fig. 6 will serve to illustrate the distribution of weight of the blade 19 and the edge 33 in such manner as to locate the center of gravity of the blade and edge assembly to a side of the pin 34 rearwardly of the direction of rotation. Consequently, while rotating, the edge 33 of the blade 19 will occupy its outermost position, as shown by the full lines in Fig. 6, which is the normal operating position. However, in the event the edge 33 should encounter some unyielding object, the blade could recede sufficiently to clear the object without damage to the machine. Also, in the event that the nut particles are fed into the machine in excess of its capacity the increased load on the edge 33 would cause it to recede and permit more of the particles to pass by the blades thereby merely reducing the shelling action instead of blocking the machine with an excess of material. In order to limit the edge 33 in its outward movement a portion of the blade disposed to the opposite side of the pin 34 from the edge 33 for engagement with the outside of the collar 17 when the edge 33 is in its outermost position is provided. By way of illustration of the principle of operation one of the blades of Fig. 6 is shown in a partially receded position.

Having thus described the invention, what I claim and desire to secure by Letters Patent of the United States is:

1. In a nut shelling machine, a plurality of shelling chambers mounted side by side with their floors in alignment on a transverse inclined plane, inlet and discharge openings communicating between adjoining chambers, a longitudinal discharge slot in the floor of each chamber adjacent the lower side wall thereof, a longitudinally disposed and centrifugally expanded impact assembly adjustably supported in each of said chambers and disposed in the paths of the gravitating material in motion on the incline of the chamber floors said impact assemblies being located immediately above said longitudinal discharge slots in the floors of said chambers with said impact assemblies extending the length of said longitudinal discharge slots and driving means for said impact assemblies.

2. In a nut shelling machine, a plurality of shelling compartments mounted side by side with their floors in alignment on a transverse inclined plane, inlet and discharge openings communicating between adjoining compartments, an impact assembly mounted longitudinally in each compartment said impact assemblies rotating in a direction whereby their lower peripheries travel in a direction opposed to the incline of the compartment floors and said impact assemblies consisting of a rotor, impact blades pivotally mounted on said rotor with the center of gravity of said blades located to a side of said pivots rearward to the direction of rotation of said rotor for normally utilizing centrifugal force to hold the impacting edge of the blades in their outermost positions and permit inward movement of the impacting edges when said edges encounter solid particles, stop means on said blades engageable with said rotors for limiting the expanded positions of the impact edges, adjustable bearings in support of said impacting assemblies for independent positioning of said assemblies with relation to the floors of the compartments, a longitudinal discharge slot in the floor of each compartment said slots being located below said impact assemblies adjacent the lower side walls of said compartments and extending the length of said impact asemblies and driving means for said impact assemblies.

3. In a nut shelling machine, a plurality of shelling chambers mounted side by side with their floors in alignment on a transverse inclined plane, a longitudinal shaft rotably mounted in each of said chambers, driving means for said shafts, impact blades pivoted to collars carried by said shafts with the center of gravity of said blades located to a side of the pivots opposite the direction of rotation of the shafts whereby centrifugal force is utilized to normally maintain the following edges of the blades in their outermost positions, an impact edge projecting from the following edges of the blades, leading blade edges projecting ahead of the centers of the pivots and adapted to engage the peripheries of the collars on said rotatable shafts when the impact edges of the blades are in their outermost operating positions, driving means for said shafts and inlet and discharge openings for all of said chambers.

4. In a nut shelling machine, a plurality of shelling compartments in tandem alignment on an inclined plane whereby each compartment occupies a different vertical position, a supply hopper communicating with the upper-most compartment, inlet and discharge openings in the side walls of adjoining compartments said openings being located at the ends of the compartments and in staggered relation so that the inlet and discharge openings for each compartment are at opposite ends thereof, a longitudinal discharge opening in the floor of each compartment said openings being located at the lower-most portion of the floors of said compartments and communicating with a common discharge chute, a discharge opening in the uppermost portion of the floor of the lowermost compartment located at the end of the compartment opposite the inlet opening thereto, a rotor mounted longitudinally in each compartment above the longitudinal discharge openings and in adjustable relation to the floors of said compartments, agitating blades pivoted to the peripheries of said rotors and the centers of gravity of said blades being located to a side of the pivots opposed to the direction of rotation for utilizing centrifugal force to maintain the operating edges of said blades in their outermost positions during the rotation of said rotors and driving means for all of said rotors.

5. In a nut shelling machine, a plurality of shelling chambers mounted side by side with their floors in alignment on a transverse inclined plane, feeding means to the uppermost of said chambers at one end thereof, an opening in the side wall at the other end of said uppermost chamber communicating with the adjoining chamber and the lower limit of said opening forming a continuation of the floors of said uppermost and adjoining chambers, similar openings between all adjoining chambers and all of said openings being located to secure an inlet opening at one end and a discharge opening at the opposite end of the respective chambers, a longitudinal discharge slot in the floor of each chamber said slot being located at the lowermost portion of said floors and extending substantially the length of the respective chambers, a common discharge chute beneath said chambers connective with all of said longitudinal discharge slots, a rotatable shaft extending throughout the length of each chamber and supported in adjustable bearings secured to the end walls of said chambers, driving means for said shafts, a plurality of collars on said shafts, a plurality of longitudinal impact blades extending the length of said longitudinal discharge slots and pivoted to said collars proximate the periphery thereof with the centers of gravity of said blades located to a side of the pivots toward the impact edges of said blades for the utilization of centrifugal force to maintain the impact edges of said blades in their normal outermost operating positions and a longitudinal portion of said blades extending transversely from the impact edge to a point opposite the pivots from the impact edge and disposed to engage the peripheries of the collars on said rotatable shafts for limiting the outward position of the impact edges of the blades during operation.

6. In a nut shelling machine, a plurality of shelling chambers mounted side by side with their floors in alignment on a transverse inclined plane, a longitudinal rotor provided in each chamber and each rotor carrying a plurality of impact blades pivoted to said rotor and the centers of gravity of said blades being located to a side of said pivots opposed to the direction of rotation of the rotor, an impact member attached to the following edge of said blades, a leading edge of said blades extending forwardly of said pivots and adapted to engage the periphery of said rotor when said impact member is in its outermost position to limit further outward movement of said impact member, a discharge opening in one end of the lower side walls of said chambers registering with an inlet opening in the upper side wall of the adjoining lower chamber, a longitudinal discharge slot in the floor of each chamber extending from the inner limit of said discharge openings in the lower side walls of said chambers to the opposite ends of the chambers and adjacent the lower side walls thereof, partitioning means between said discharge openings in the lower side walls of the chambers and said longitudinal slots in the floors of said chambers said partitioning means extending partially across the width of the chambers and defining the length of said impact blades.

7. In a nut shelling machine, a plurality of shelling compartments in tandem alignment on an inclined plane, a nut supply hopper communicating with the upper portion of the uppermost compartment and at one end thereof, openings establishing communication between adjoining compartments the lower limits of said openings forming a continuation of the floors of the adjoining compartments and said openings being located at the ends of said compartments in staggered relation so that the inlet opening for any compartment is located opposite the discharge end of the compartment, a longitudinal discharge slot in the floor of each compartment communicating with a common discharge chute and said discharge slots being located at the lowermost point in the floors of their respective compartments, an agitating rotor mounted longitudinally in each compartment in spaced relation to the floor thereof and above said longitudinal discharge slots, a power source for driving said rotors and pulley and belt driving means connecting said rotors and said power source whereby the use of different sized pulleys on the various rotor shafts may be utilized to attain different rotor speeds in the separate compartments.

8. In a nut shelling machine, a plurality of shelling chambers mounted side by side with their floors in alignment on a transverse inclined plane, inlet openings in the upper side walls and discharge openings in the lower side walls of adjoining chambers at the ends thereof and said openings being so staggered that the discharge opening for each chamber registers with the inlet opening of the adjoining chamber, a longitudinal discharge slot in the floor of each chamber adjacent the lower side wall thereof and extending from the discharge opening in the lower side wall of the chamber to the opposite end of the chamber all of said longitudinal discharge slots communicating with a common discharge chute, partitions located between said discharge openings in the lower walls of said chambers and said discharge slots in the floors of the chambers said partitions extending the depth of the chambers and from the lower side walls thereof to a distance approximately half the width of the chambers, a longitudinally disposed and centrifugally expanded impact assembly adjustably mounted in each of said chambers and disposed in the paths of the gravitating material in motion on the inclined floors of the chambers said impact assemblies being located immediately above said longitudinal discharge slots in the floors of said chambers and extending the length of said longitudinal discharge slots and driving means for said impact assemblies.

9. In a nut shelling machine, a plurality of shelling compartments in tandem the bottoms of which are in alignment on an inclined plane, a nut entrance to the upper portion of the uppermost compartment, nut passage openings establishing communication between adjoining compartments the floor of said openings forming a continuation of said compartment floors and said openings being so located at opposite ends of said compartments that the entrance opening to each compartment is located at an end opposite to its discharge opening, a longitudinally disposed discharge opening from the lowermost portion of the floor of each of said compartments extending substantially the length thereof, a nut agitating rotor mounted longitudinally of each compartment said rotors being supported in vertically adjustable bearings in the end walls of the compartments and said rotors being located above said longitudinal discharge openings in a predetermined position with relation to the floors of the compartments for agitating the nut particles as they gravitate along the inclined planes of the compartment floors into the paths of the rotors, a longitudinal baffle plate adjustably secured to the end walls of each compartment said baffle plates being located above said rotors and extending from the upper limit of said compartments downwardly to a point proximate the centers of said rotors, a common discharge chute connective with all of said longitudinal discharge openings in the floors of said compartments, an independent discharge opening from the lowermost compartment located in the floor of the compartment above the rotor therein and at the end of the compartment opposite its inlet opening and driving means for said rotors.

10. In a nut shelling machine, a plurality of shelling chambers mounted side by side with their floors in alignment on a transverse inclined plane, inter-chamber inlet and discharge means for each of said chambers said inlet and discharge means being located at opposite ends of their respective chambers and the inlet means for one chamber forming the discharge means for the next higher preceding chamber, a longitudinal discharge slot in the floor of each chamber at the lowest portion thereof and extending from the inner limit of said inter-chamber inlet and discharge means to the opposite end of the respective chambers, partitioning means interposed between said longitudinal discharge slots and said inter-chamber inlet and discharge means and extending the depth of the chambers from the lower walls thereof a distance substantially half the width of the chambers, a rotatable shaft mounted longitudinally of said chambers said shafts passing through said partitioning means and being supported in adjustable bearings attached to the end walls of said chambers, a plurality of collars on each of said shafts, a plurality of longitudinal impact blades pivoted proximate the peripheries of said collars and extending from said partitioning means to the opposite ends of the chambers, an impact edge formed on one side of said blades and proportioned to dispose the center of gravity of the blade to the side of the pivot toward said impact edge, a transverse extension from said blade projected to a point beyond the pivoting point and disposed to engage the periphery of the collars on said rotatable shafts when the impact edges are in their outermost positions and driving means for said shafts.

SALVADOR GUERRA.